United States Patent
Dietz

[15] 3,676,343
[45] July 11, 1972

[54] AMORPHOUS BORON-SILICON-NITRIDE MATERIALS

[72] Inventor: John W. Dietz, Wilmington, Del.

[73] Assignee: E. I. du Pont de Nemours and Company, Wilmington, Del.

[22] Filed: March 10, 1969

[21] Appl. No.: 805,837

[52] U.S. Cl. ................................252/25, 23/191, 252/432, 252/433, 106/55
[51] Int. Cl. ..............................................C10m 5/02
[58] Field of Search ..................252/25, 432, 433; 23/191

[56] References Cited

UNITED STATES PATENTS

| | | | |
|---|---|---|---|
| 1,154,800 | 9/1915 | Peacock | 23/191 |
| 2,865,715 | 12/1958 | Kamlet | 23/191 |
| 3,352,637 | 11/1967 | Heymer et al. | 23/191 |
| 3,455,729 | 7/1969 | Deeley et al. | 23/191 |

Primary Examiner—Daniel E. Wyman
Assistant Examiner—I. Vaughn
Attorney—Norbert F. Reinert

[57] ABSTRACT

Amorphous boron-silicon-nitride ternary nitrides are prepared by reacting boron trichloride [$BCl_3$], silicon tetrachloride [$SiCl_4$], and ammonia. The products are resistant to oxidation; have a surface area greater than 100 $m^2/gm$; and are useful at high temperatures as insulation, catalyst supports, and dry lubricants.

7 Claims, No Drawings

AMORPHOUS BORON-SILICON-NITRIDE MATERIALS

DESCRIPTION OF THE INVENTION

SUMMARY

The present invention relates to an amorphous ternary nitride having a surface area greater than 100 m²/gm. prepared by:

A. reacting at a temperature of from −20° to 100° C. (i) a molar excess of ammonia with (ii) a mixture of boron trichloride and silicon tetrachloride, the mole ratio of boron trichloride to silicon tetrachloride being in the range of from 9:1 to 1:9;

B. heating the product of step (A) to 600°C. in the presence of ammonia and thereafter maintaining the product in the presence of ammonia at a temperature of from 600° to 1,200°C. until the chlorine content of the resulting nitride is below about 5 percent by weight.

The products of this invention are amorphous, resistant to oxidation, and have surface areas greater than 100 m²/gm. even after being heated to 1,400° C. for as long as 2 hours.

STARTING MATERIALS

Generally speaking, high purity boron trichloride, silicon tetrachloride, and ammonia should be used to make the products of this invention. All three materials are readily available on a commercial basis. Boron trichloride is a gas at room temperature and has a boiling point of 13° C. Silicon tetrachloride is a liquid at room temperature and has a boiling point of 57.6° C. The mole ratio of boron trichloride to silicon tetrachloride should be in the range of from 9:1 to 1:9, preferably in the range of from 3:2 to 2:3.

PROCESS OF MANUFACTURE

Step 1

In the first step of this process, an excess of ammonia is added to a mixture of boron trichloride and silicon tetrachloride. An excess of ammonia can be determined according to the following formula:

$$M_A \geq 6 M_{BC} + 8 M_{ST}$$ where:

$M_A$ = moles of ammonia;
$M_{BC}$ = moles of boron trichloride; and
$M_{ST}$ = moles of silicon tetrachloride.

It should be understood, however, that the products of this invention can be made using lesser amounts of ammonia but the yield will be lower because some of the metal chlorides will escape during the subsequent heating step. An exothermic reaction occurs upon the addition of the ammonia which can be considered complete when heat generation ceases. This reaction may be accomplished by mixing boron trichloride and silicon tetrachloride below 13° C. and thereafter adding ammonia to the boron trichloride-silicon tetrachloride mixture at a rate such that the temperature of the reaction mixture is maintained below 13° C.

The reaction may, however, be carried out at a temperature anywhere in the range of from −20° to 100° C.

Another method of carrying out Step 1 is to premix the boron trichloride and silicon tetrachloride, atomize the mixture in a spray column, and thereafter react the atomized mixture with ammonia in a temperature range of from 0° to 100° C. The reaction between gaseous ammonia and the atomized chlorides is almost instantaneous. The rate of addition of the chlorides is governed only by the ability of the equipment to carry away heat so that the reaction may be conducted in the desired temperature range. Ammonia is added at such a rate as to react completely with the metal chlorides present in the spray column.

The intermediate product of Step 1 is a solid and is thought to be a complex ternary mixture of boron-silicon-amidochlorides. These intermediates must be kept in a non-oxidizing atmosphere to prevent decomposition. Normally, however, Step 1 will be followed immediately by Step 2 and accordingly no isolation of the intermediate is required.

Step 2

The reaction intermediate of Step 1 is heated in a stream of ammonia to 600°–1200° C. to effect what is believed to be a decomposition of the amidochlorides to the nitride. While the rate of ammonia flow is not critical, it has been found that a rate of one part of ammonia (by weight) per minute per 200 parts of intermediate is satisfactory. Ammonia is needed particularly in the early stages of heating (up to 600° C.) to prevent reversal of the reaction of Step 1. In Step 2, chlorine is eliminated as ammonium chloride [NH₄Cl] and hydrochloric acid [HCl]. The amount of chlorine present in the final nitride depends on how long the product is held at the higher temperature. The final ternary nitrides should generally have a chlorine content of less than about 5 percent by weight, preferably below 2 percent, and more preferably below 1 percent. Materials having less than 1 percent chlorine are generally obtained by maintaining a temperature of about 850°–1,200° C. for from 1 to several hours.

CHARACTERIZATION OF THE PRODUCTS

While the exact chemical configuration or composition of the products of this invention are not known, X-ray data indicate that the materials are amorphous. The surface area of the products is at least 100 m₂/gm., preferably 200 m²/gm. The higher surface areas are obtained by use of shorter heating times and lower temperatures. The products of the invention are resistant to oxidation.

EXAMPLE 1

A glass flask is placed in an ice bath and a dry ice condenser is attached thereto. All oxygen and moisture are removed by purging with dry nitrogen. Three hundred sixty parts of silicon tetrachloride and 269 parts of boron trichloride are mixed together in the flask. Ammonia vapor is fed to the flask until no more heat is evolved, at which time approximately 400 parts of ammonia are consumed. The reaction mixture is transferred, in a dry, oxygen-free atmosphere, to a molybdenum boat and placed in a dry, oxygen-free tube furnace. Ammonia is passed through the furnace at the rate of 0.75 parts per minute and the product is heated to 600° C. in 3 hours. After holding the temperature at 600° C. for one hour, the product is heated to 900° C. in 11½ hours and held there for half hour, maintaining the same rate of ammonia flow. After cooling to room temperature, 125 parts of fine, light powder are obtained. This powder is found, on analysis, to contain 14.5 percent boron, 39.1 percent Si, 45.2 percent N, and 0.15 percent Cl. The powder has a surface area, by nitrogen adsorption, of 208 m²/gm. Examination of this material by X-ray diffraction reveals only a broad, diffuse band of scattered X-rays with no distinct lines. This powder has a settled bulk density of 0.075 g/cc.

EXAMPLE 2

Samples of the following materials are placed in a tube furnace, heated in a nitrogen atmosphere to 1,400° C., held at 1,400° C. for 2 hours, and allowed to cool to room temperature:

1. the product of Example 1;
2. a mixture of 10 percent boron nitride [BN] 90 percent silicon nitride [$Si_3N_4$];
3. BN;
and
4. $Si_3N_4$.

The surface area of each material is measured before and after the above-described treatment. The results are as follows:

TABLE 1

| Material | Surface Area (m²/gm.) | |
|---|---|---|
| | Before | After |
| 1 | 208 | 144 |
| 2 | 201 | 49 |
| 3 | 75 | 23 |

| 4 | 240 | 3.8 |

This data indicates that the products of this invention are not merely a mixture of boron nitride and silicon nitride and that the surface area of the materials remains above 100 m²/gm. even after 2 hours of heating above 1,400° C.

EXAMPLE 3

Three hundred sixty parts of silicon tetrachloride and 260 parts of boron trichloride are reacted with ammonia as in Example 1. The product is transferred to a tube furnace and heated as in Example 1 except that the final temperature is 800° C. instead of 900° C. This product is found to contain 14.5 percent boron, 39.5 percent silicon, 42.7 percent nitrogen, and 2.1 percent chlorine. It has a surface area, by nitrogen adsorption, of 302 m²/g., and examination by X-ray diffraction reveals no distinguishable diffraction lines.

EXAMPLE 4

Samples of the following materials are heated to 900° C. in air for 1 hour:
(1) the product of Example 3;
(2) a mixture of 54 percent BN and 46 percent $Si_3N_4$;
(3) BN;
and
(4) $Si_3N_4$.

The weight gain of each material after the above treatment is as follows:

TABLE 2

| Material | Weight Gain (%) | Change in Appearance |
|---|---|---|
| 1 | + 3 | None |
| 2 | +22 | Badly Sintered |
| 3 | +27 | Partially Fused |
| 4 | + 2 | None |

The above data show that the oxidation resistance of the products of this invention are different from the oxidation of a mixture of BN and $Si_3N_4$.

Example 5

Fifty parts of silicon tetrachloride and 100 parts of boron trichloride are reacted with ammonia and heated to 900° C. as in Example 1. Twenty-eight parts of fine, light powder are recovered. This product is found to contain 26.2 percent boron, 23.1 percent silicon, 49.2 percent nitrogen and 0.1 percent chlorine. It has a surface area, by nitrogen adsorption, of 237 m²/gm., and has no distinguishable X-ray diffraction lines.

UTILITY

The ternary nitride products of this invention are useful as high temperature insulation, for example as an insulating fill between the furnace lining and the furnace exterior. At present, carbon black is the only insulating material of low bulk density with sufficient resistance to sintering at high temperatures. Carbon black has the disadvantages, however, of oxidizing quite readily and of reacting with metals at high temperatures. The instant products are an improvement in this regard over carbon black. The products of this invention are also useful as high temperature catalyst supports and as high temperature dry lubricants.

I Claim:

1. A process for producing an amorphous ternary nitride having a surface area greater than 100 m²/gm. comprising:
   A. reacting at a temperature of from −20° to 100°C. (i) a molar excess of ammonia with (ii) a mixture of boron trichloride and silicon tetrachloride, the mole ratio of boron trichloride to silicon tetrachloride being in the range of from 9:1 to 1:9;
   B. heating the product of step (A) to 600°C. in the presence of ammonia and thereafter maintaining the product in the presence of ammonia at a temperature of from 600° to 1,200°C. until the chlorine content of the resulting ternary nitride is below about 5 percent by weight.

2. The product produced by the process of claim 1.

3. The process of claim 1 wherein the mole ratio of boron trichloride to silicon tetrachloride is in the range of from 3:2 to 2:3.

4. The product produced by the process of claim 3.

5. The product of claim 2 wherein the chlorine content is below 2 percent.

6. The product of claim 5 wherein the chlorine content is below 1 percent.

7. The product of claim 2 wherein the surface area is greater than 200 m²/gm.

* * * * *